United States Patent [19]
Watanabe et al.

[11] Patent Number: 5,339,084
[45] Date of Patent: Aug. 16, 1994

[54] RADAR APPARATUS

[75] Inventors: Tsutomu Watanabe, Kawasaki; Mitsuyoshi Shinonaga, Yokohama, both of Japan

[73] Assignee: Kabushiki Kaisha Toshiba, Kawasaki, Japan

[21] Appl. No.: 34,896

[22] Filed: Mar. 19, 1993

[30] Foreign Application Priority Data

Mar. 31, 1992 [JP] Japan .................................. 4-077175

[51] Int. Cl.$^5$ ......................................... G01S 13/538
[52] U.S. Cl. ................................ 342/160; 342/132; 342/131; 342/129
[58] Field of Search ................. 342/129, 131, 132, 160

[56] References Cited
U.S. PATENT DOCUMENTS

3,225,349  12/1965  Thor ...................................... 342/163
3,905,033   9/1975  Moore et al.
4,136,341   1/1979  Mulder et al. ........................ 342/160
5,140,332   8/1992  Martin et al. ........................ 342/202

*Primary Examiner*—John B. Sotomayor
*Attorney, Agent, or Firm*—Oblon, Spivak, McClelland, Maier & Neustadt

[57] ABSTRACT

There is provided a radar apparatus wherein a local signal having a coherent sine wave is modulated to generate a composite signal of two signals modulated by different modulation functions. The composite signal is transmitted as a transmission signal, and a reception signal associated with the transmitted signal is separated into two signal components modulated by the different modulation functions. A difference between the two signal components is found, thereby removing a reflection signal from a static clutter and extracting a signal component which has been frequency-deviated by a moving target. Thus, the moving target is displayed. The transmission frequency can be quickly changed without losing the function of detecting the moving target.

5 Claims, 7 Drawing Sheets

RADAR APPARATUS

BACKGROUND OF THE INVENTION

1. Field of the Invention

The present invention relates to a radar apparatus having a function for quickly changing a transmission frequency, without losing a moving target display function, and a function for removing an unnecessary signal reflected by a static target.

2. Description of the Related Art

In a conventional radar apparatus, transmission pulses are transmitted at regular cycles, and frequency deviation components caused by a moving target are extracted from the received reflection pulse wave signals with respect to each transmission pulse. The position of the moving target is determined on the basis of the frequency deviation components, and the determined position is displayed in a predetermined mode. In this case, the position of the moving target is found by detecting the Doppler frequency on the basis of the transmission frequency. Thus, the frequency of the transmission pulses is constant.

However, if the frequency of transmission pulses is constant, radar radio waves are easily detected. In particular, in modern electronic warfare the radar radio waves are easily jammed. Under these circumstances, there is a strong demand for a radar apparatus capable of quickly changing the transmission frequency, thereby preventing jamming of radio waves.

SUMMARY OF THE INVENTION

As has been described above, in the conventional radar apparatus, if the transmission frequency is changed to prevent jamming, the Doppler frequency associated with the moving target cannot be detected and the moving target cannot be detected or displayed.

The present invention has been made to solve the above problem. The present invention provides a radar apparatus capable of detecting a moving target while suppressing a clutter, and capable of quickly changing the transmission frequency without losing the function of detecting the moving target.

According to one aspect of the invention, there is provided a radar apparatus comprising:

local signal generating means for generating a first local signal and a second local signal which are coherent sine wave signals having different frequencies;

local signal modulation means for modulating one of the first and second local signals generated from the local signal generating means, thereby generating a composite signal of two signals modulated by different modulation functions;

two-frequency generating means for generating first and second transmission signals of different frequencies on the basis of a combination of the composite signal obtained by the local signal modulation means and the non-modulated local signal;

transmission/reception means for repeatedly transmitting the first and second transmission signals generated by the two-frequency generating means in a time-sharing manner, and receiving a reflection signal of the transmitted signals;

signal separating means for separating the received signal received by the transmission/reception means into two frequency components corresponding to the first and second transmission signals;

MTI processing means for separating each reception signal separated by the signal separating means into two signal components modulated by the different modulation functions and removing a reflection signal from a static clutter by a subtraction operation, and thereafter synchronizing the two reception signals, thereby extracting a reflection signal component from a moving target; and display means for displaying the moving target on the basis of the detection output from the MTI processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described in detail with reference to the accompanying drawings.

Figure 1:
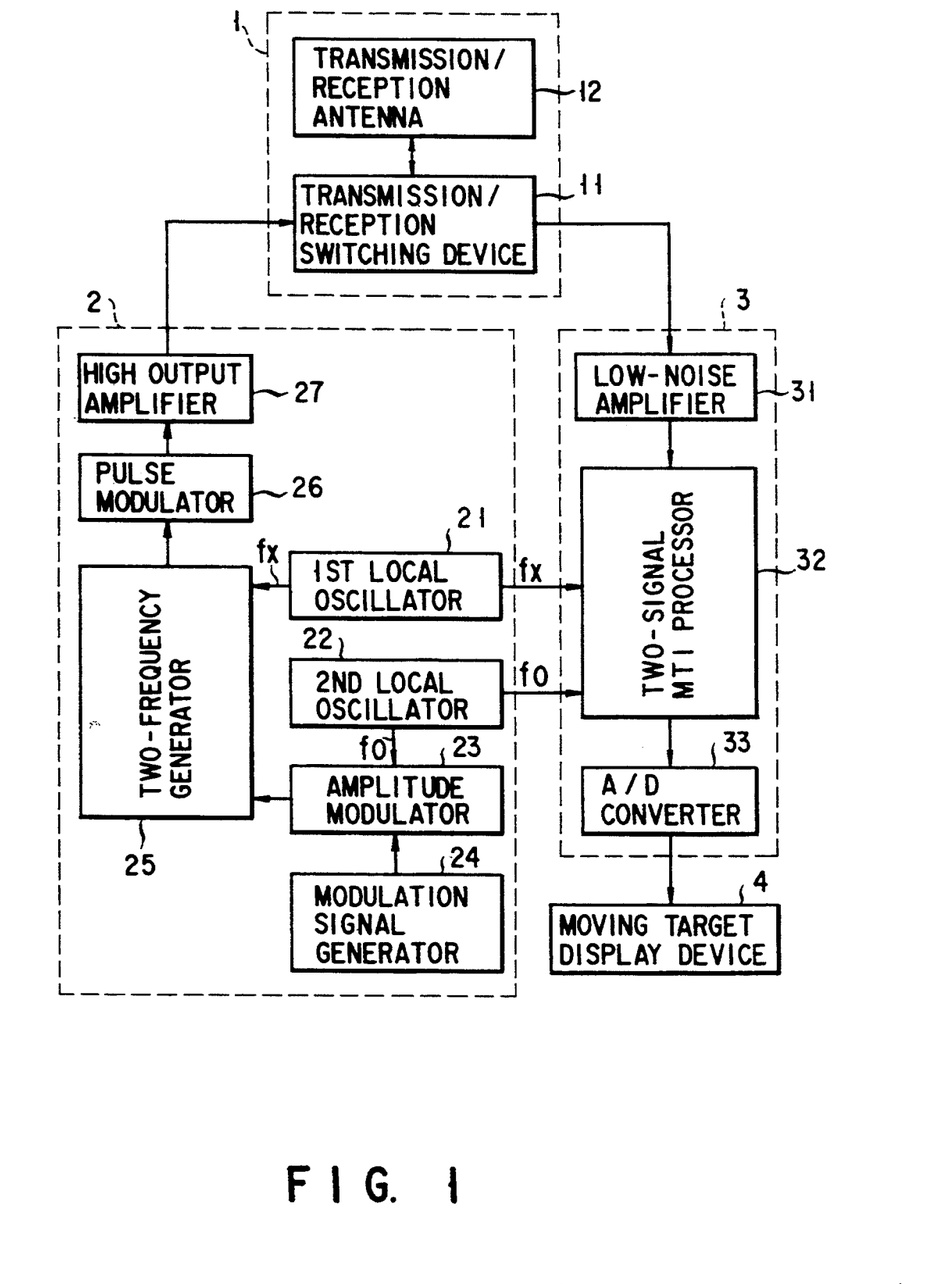
FIG. 1 shows a basic structure of a radar apparatus according to an embodiment of the present invention.

FIG. 1 shows a basic structure of a radar apparatus according to an embodiment of the present invention. The radar apparatus comprises an antenna unit 1, a transmitter unit 2, a receiver unit 3, and a moving target display device 4.

The transmitter unit 2 comprises a first local oscillator 21 for generating a first local signal having a frequency fx and a second local signal oscillator 22 for generating a second local signal having a frequency f0. The first local signal functions as a carrier wave, and the frequency fx is much higher than the frequency f0 of the second local signal. On the other hand, the second local signal generated by the second local oscillator 22 is supplied to an amplitude modulator 23 and it is amplitude-modulated by a modulation signal generated by a modulation signal generator 24. The modulated signal, along with the first local signal from the first local oscillator 21, is supplied to a two-frequency generator 25.

Figure 2:
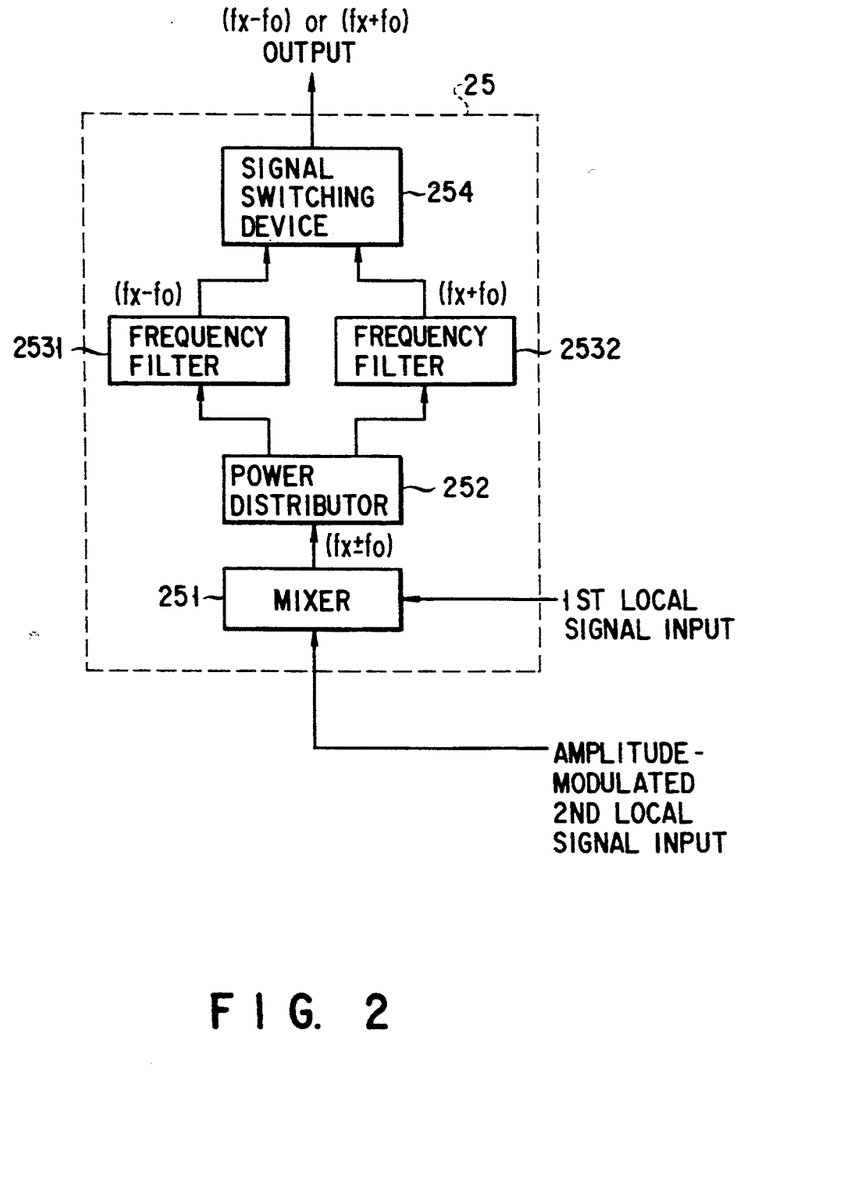
FIG. 2 is a block diagram showing a specific structure of a two-frequency generator shown in FIG. 1.

The specific structure of the two-frequency generator 25 is shown in FIG. 2. The input first and second local signals are mixed in a mixer 251. The mixed signal is a composite signal of a sum component fx+f0 and a difference component fx−f0, and the composite signal is distributed to two lines by a power distributor 252. The two lines are provided with frequency filters 2531 and 2532. The frequency filter 2531 receives part of the composite signal distributed from the power distributor 252 and extracts a difference frequency signal (frequency fx−f0). The other frequency filter 2532 receives the other part of the composite signal distributed from the power distributor 252 and extracts a sum frequency signal (frequency fx+f0). The two frequency signals obtained from the frequency filters 2531 and 2532 are sent to a signal switching device 254.

The signal switching device 254 alternately passes the frequency signals from the frequency filters 2531 and 2532 at a repetition cycle of the modulation signal generated by the modulation signal generator 24, thereby generating a two-frequency transmission RF signal in which the difference component and sum component are multiplexed in a time-sharing manner.

The transmission RF signal generated by the two-frequency generator 25 is delivered to a pulse modulator 26. The pulse modulator 26 repeatedly generates transmission pulses at regular intervals. The transmission pulses include, as sub-pulses, the difference component signal and sum component signal multiplexed on the input transmission RF signal in a time-sharing manner. The transmission pulses are power-amplified by a high output amplifier 27, and the amplified pulses are delivered to the antenna unit 1.

In the antenna unit 1, the transmission pulses delivered from the transmitter unit 2 are sent to a transmission/reception antenna 12 via a transmission/reception switching device 11. The antenna 12 radiates the transmission pulses in a predetermined direction and receives reflection wave signals from various static or moving targets in the repetition cycle at the repetition transmission/reception cycles. The reception signals are sent to the receiver unit 3 via the transmission/reception switching device 11.

Figure 3:
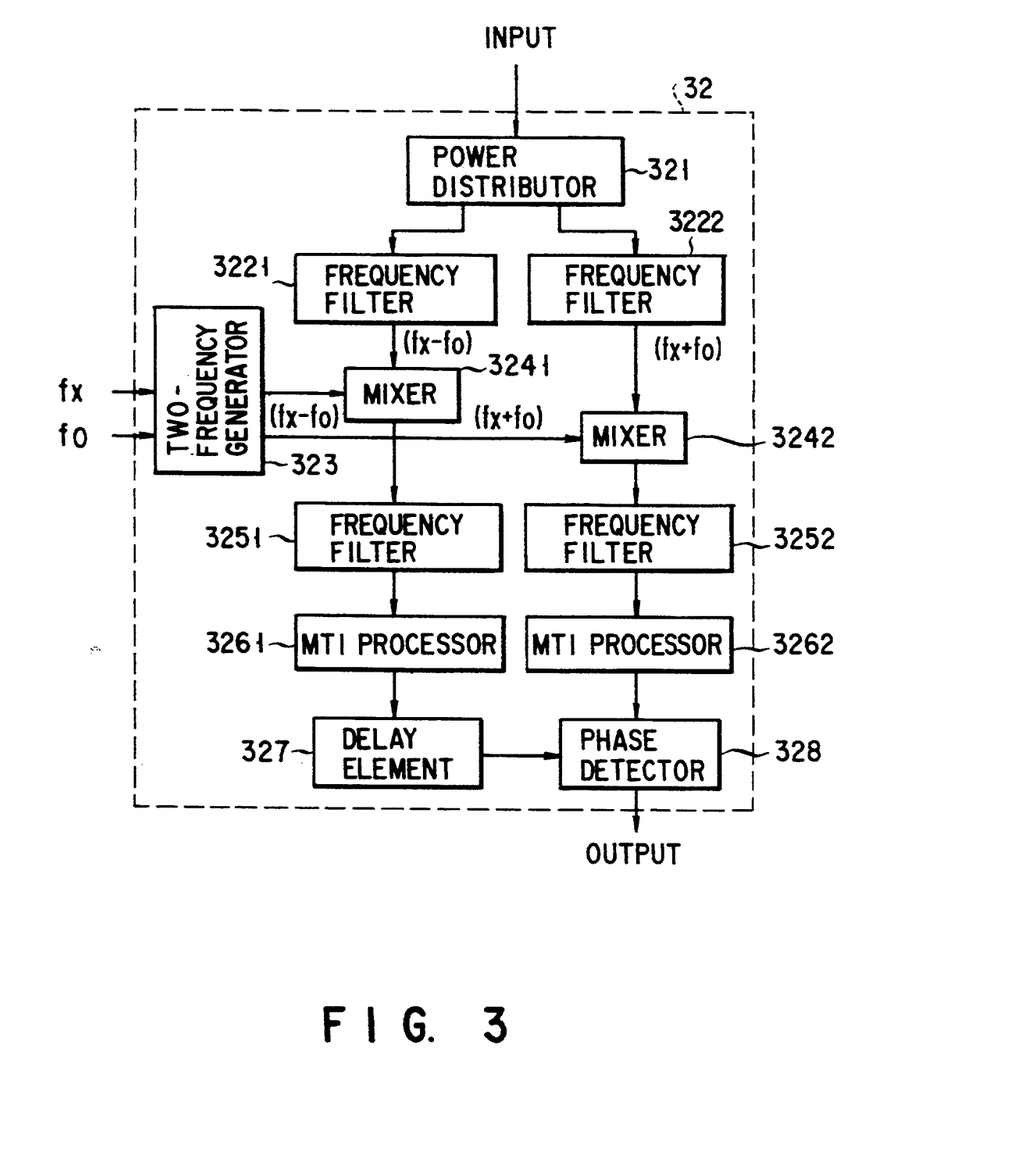
FIG. 3 is a block diagram showing a specific structure of a two-signal MTI processor shown in FIG. 1.

In the receiver unit 3, the signals received by the antenna unit 1 are amplified by a low-noise amplifier 31 and then supplied to a two-signal MTI processor 32. FIG. 3 shows a specific structure of the two-signal MTI processor 32.

Referring to FIG. 3, the input reception signal is distributed to two lines by a power distributor 321 and delivered to frequency filters 3221 and 3222 provided in the two lines. The frequency filter 3221 extracts a frequency component of fx-f0 (hereafter referred to as "difference component reception signal") and the frequency filter 3222 extracts a frequency component of fx+f0 (hereinafter "sum component reception signal").

In the two-signal MTI processor 32, a two-frequency generator 323 receives the first and second local signals (frequencies fx, f0) from the transmitter-side first and second local oscillators 21 and 22 and generates a difference component signal (frequency fx−f0) and a sum component signal (frequency fx+f0).

The difference component reception signal extracted from the frequency filter 3221 and the difference component signal (fx−f0) are mixed by a mixer 3241. An unnecessary frequency component is removed from the mixed signal in a frequency filter 3251. The output from the filter 3251 is fed to an MTI processor 3261.

Similarly, the sum component reception signal extracted from the frequency filter 3222 and the sum component signal (fx+f0) are mixed by a mixer 3242, and an unnecessary frequency component is removed from the mixed signal in a frequency filter 3252. The output from the filter 3252 is fed to an MTI processor 3262.

Figure 4:
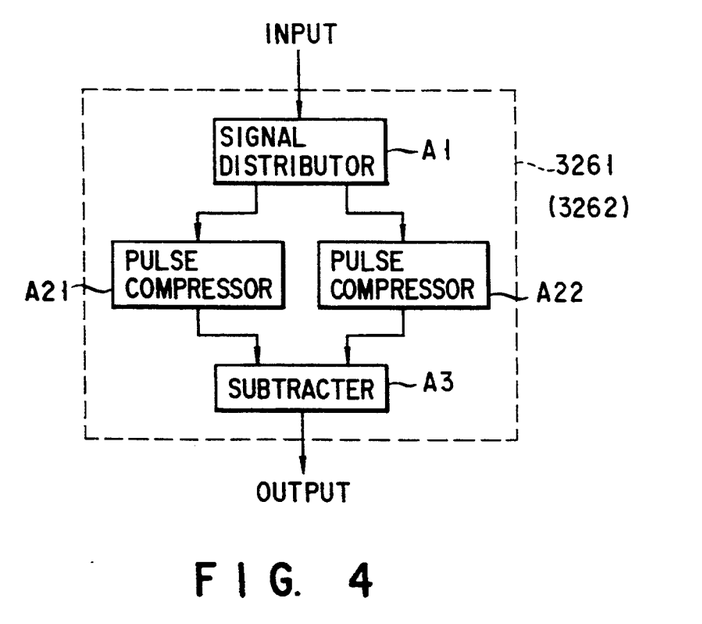
FIG. 4 is a block diagram showing a specific structure of an MTI processor shown in FIG. 3.

Each of the MTI processors 3261 and 3262 has a structure as shown in FIG. 4. The input frequency signal is distributed to two lines by a signal distributor A1, and the distributed frequency signals are input to pulse compressors A21 and A22, respectively. The pulse compressor A21 compresses the input signal with particular frequency/time characteristics. The other pulse compressor A22 compresses the input signal with frequency/time characteristics reverse to the frequency/time characteristics of A21.

The outputs from the pulse compressors A21 and A22 are subjected to subtraction processing in a subtracter A3. The degree of variation of the reflection signal components relating to a static clutter is unchanged even if these components are compressed by the pulse compressors A21 and A22 with mutually opposite characteristics. Accordingly, by subjecting the outputs from the pulse compressors A21 and A22, the reflection signal components relating to the static clutter are removed.

The output from the MTI processor 3261 is fed to a delay element 327. The delay element 327 delays the output from the MTI processor 3261 by a delay time corresponding to the switching timing of the signal switching device 254 of the two-frequency generator 25. Thereby, the output from the MTI processor 3261 is made to coincide with the output timing of the MTI processor 3262. The output from the delay element 327 and the output from the MTI processor 3262 are fed to a phase detector 328.

In the phase detector 328, both inputs are multiplied to obtain I-video and Q-video signals. The phase-detection signals (I-video and Q-video signals) are converted to digital signals by an A/D converter 33, and the digital signals are delivered to the moving target display device 4.

The moving target display device 4 receives digital signals from the receiver unit 3 and extracts temporally-phase-varied signal components by digital signal processing. The temporally-phase-varied signal components are Doppler frequency components relating to the moving target. The display device 4 displays appropriately the position of the moving target as well as other radar information.

Figure 5:
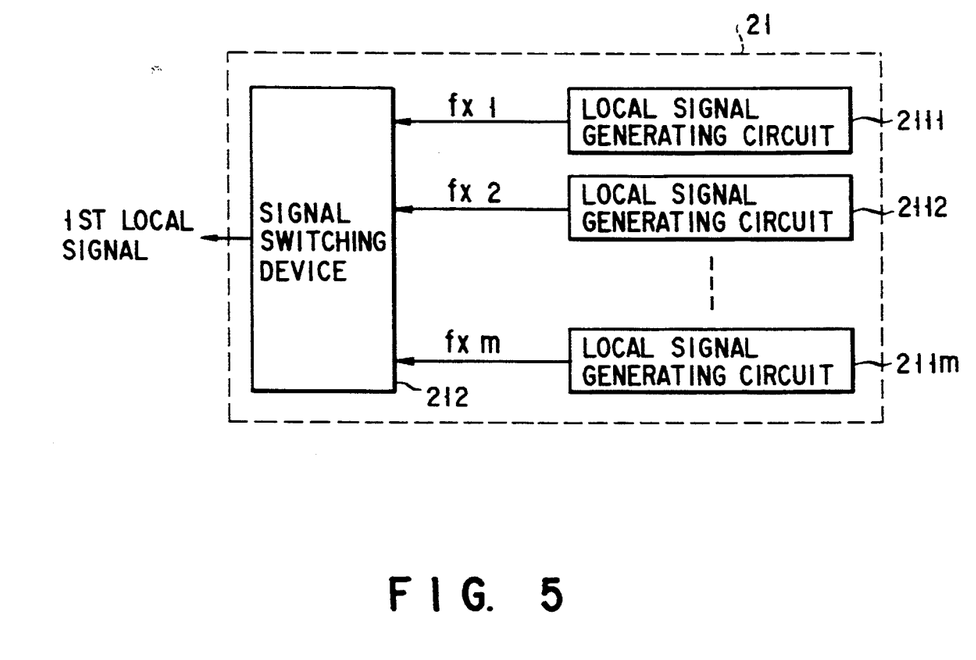
FIG. 5 is a block diagram showing a specific structure of a first local oscillator shown in FIG. 1.

FIG. 5 shows a specific structure of the first local oscillator 21. The oscillator 21 comprises a plurality of (in this embodiment, an m-number of) local signal generating circuits 2111 to 211m and a signal switching device 212. The local signal generating circuits 2111 to 211m generate signals of mutually different frequencies. The signal switching device 212 selectively passes outputs from the local signal generating circuits 2111 to 211m, thereby outputting the first local signal of optionally varied frequency.

The operation of the radar apparatus having the above structure will now be described.

Suppose that in the transmitter unit the first local oscillator 21 successively outputs the first local signal of frequencies fx1, fx2, ..., at the transmission pulse repetition cycle T. In addition, suppose that the modulation signal generator 24 generates a modulation signal having a frequency increasing linearly with the passing of time (the frequency varies between $-\Delta f$ and $+\Delta f$ with reference to a center frequency 0 in a time period $\tau$).

Figure 6:
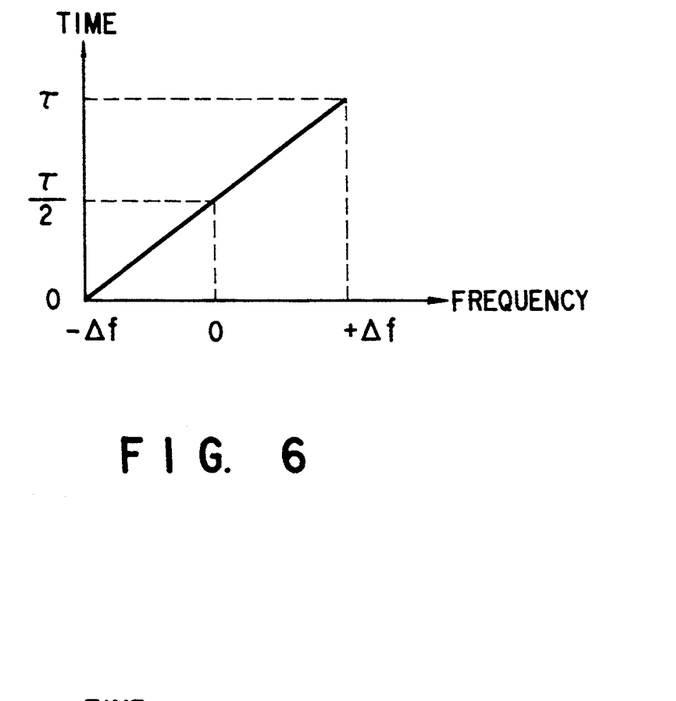
FIG. 6 is a graph showing frequency/time characteristics of an up-chirp formed in a transmission RF signal by amplitude modulation of a second local signal in the embodiment.
Figure 7:
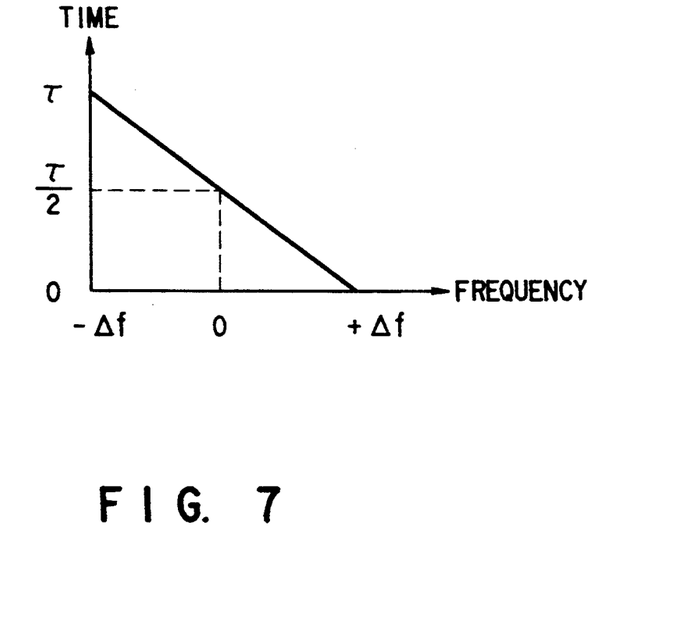
FIG. 7 is a graph showing frequency/time characteristics of a down-chirp formed in a transmission RF signal by amplitude modulation of a second local signal in the embodiment.

The first local signal is supplied directly to the two-frequency generator 25, and the second local signal is amplitude-modulated by the modulation signal in the amplitude modulator 23 and then supplied to the two-frequency generator 25. The two-frequency generator 25 generates a difference component signal and a sum component signal on the basis of the two inputs. At this time, each component signal has characteristics obtained by compounding up-chirp characteristics shown in FIG. 6 and down-chirp characteristics shown in FIG. 7.

Figure 8:
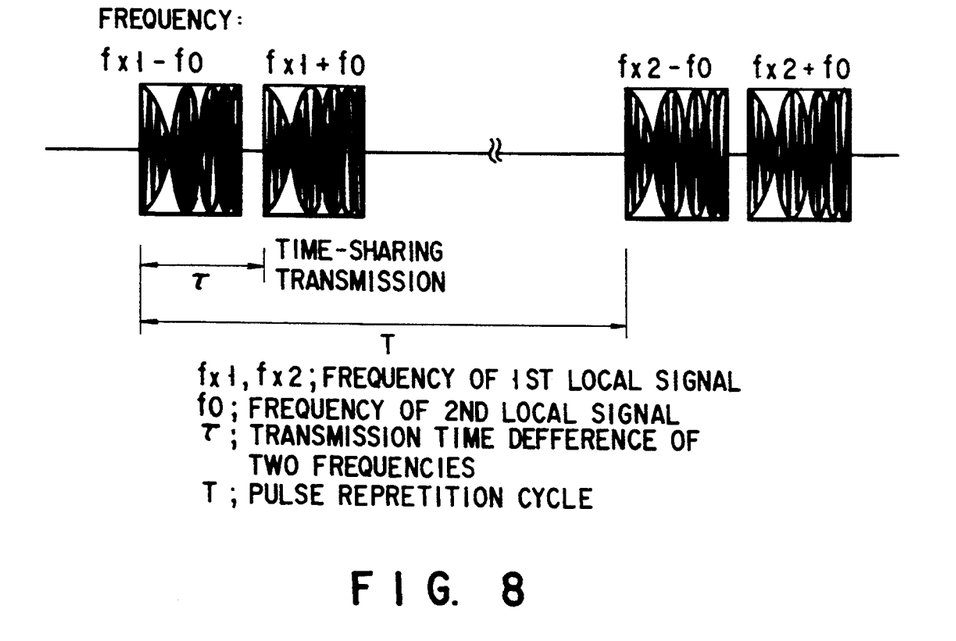
FIG. 8 is a timing chart illustrating a pulse signal time-sharing transmission method in the embodiment.

Each component signal with these characteristics is multiplexed in a time-sharing manner with a time difference $\tau$ in a repetition transmission pulse period T and converted to a sub-pulse constituting part of the transmission pulse in the pulse modulator 26. At this time, the first local signal is switched in the order of fx1, fx2, ..., at the pulse repetition cycle T. The transmitted output is shown in FIG. 8. In FIG. 8, two pulses (the first pulse is a difference component, the second pulse is a sum component) are output in a time-sharing manner with a time delay $\tau$ in the pulse repetition cycle T.

The antenna unit 1 radiates the above transmission pulses, and receives reflection pulse wave signals. The reception signals are delivered to the two-signal processor 32 of the receiver unit.

In the two-signal MTI processor 32, the reception signals are distributed to two lines. Each distributed signal is a composite signal of a reflection signal component corresponding to the sum component signal generated in the transmitter unit and a reflection signal component corresponding to the difference component signal generated in the transmitter unit.

Regarding the first line, the frequency filter 3221 extracts the difference component reception signal from the distributed signal. The mixer 3241 mixes the extracted difference component reception signal with a difference component frequency signal coherent with the difference component transmission signal generated in the transmitter unit, thereby producing an intermediate frequency signal. An unnecessary frequency component is removed from the intermediate frequency signal in the frequency filter 3251, and the filtered signal is fed to the MTI processor 3261.

Figure 9:
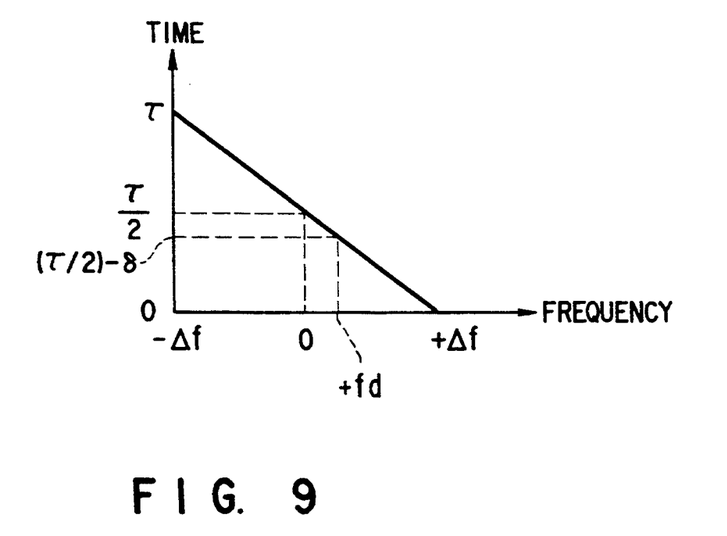
FIG. 9 is a graph showing frequency/time characteristics of a demodulation function used in one of pulse compressors shown in FIG. 4.
Figure 10:
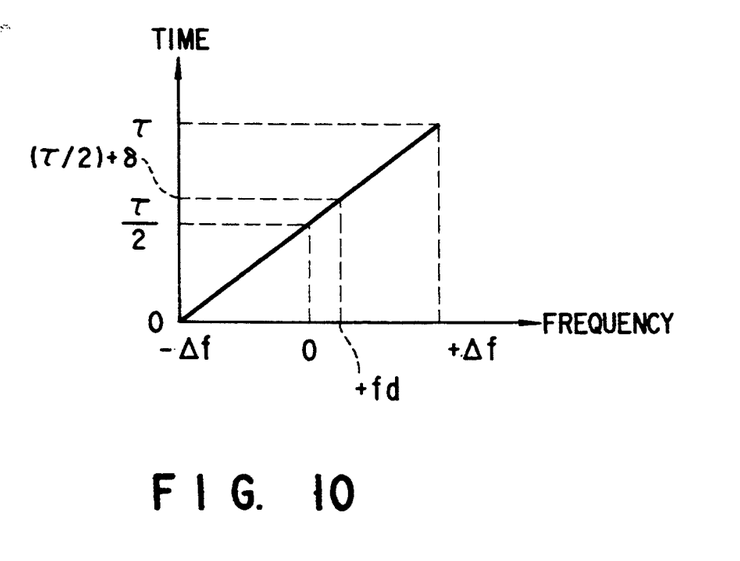
FIG. 10 is a graph showing frequency/time characteristics of a demodulation function used in the other pulse compressor shown in FIG. 4.

In the MTI processor 3261, the input signal is distributed to two lines and pulse-compressed by the pulse compressors A21 and A22 with frequency/time demodulation characteristics shown in FIGS. 9 and 10. Specifically, the input signal is a composite signal of an up-chirp signal and a down-chirp signal. Thus, if demodulation is performed by the pulse compressor A21 having the characteristics of FIG. 9, only the up-chirp signal is pulse-compressed. If demodulation is performed by the pulse compressor A22 having the characteristics of FIG. 10, only the down-chirp signal is pulse-compressed.

Figures 11A, 11B, 11C:
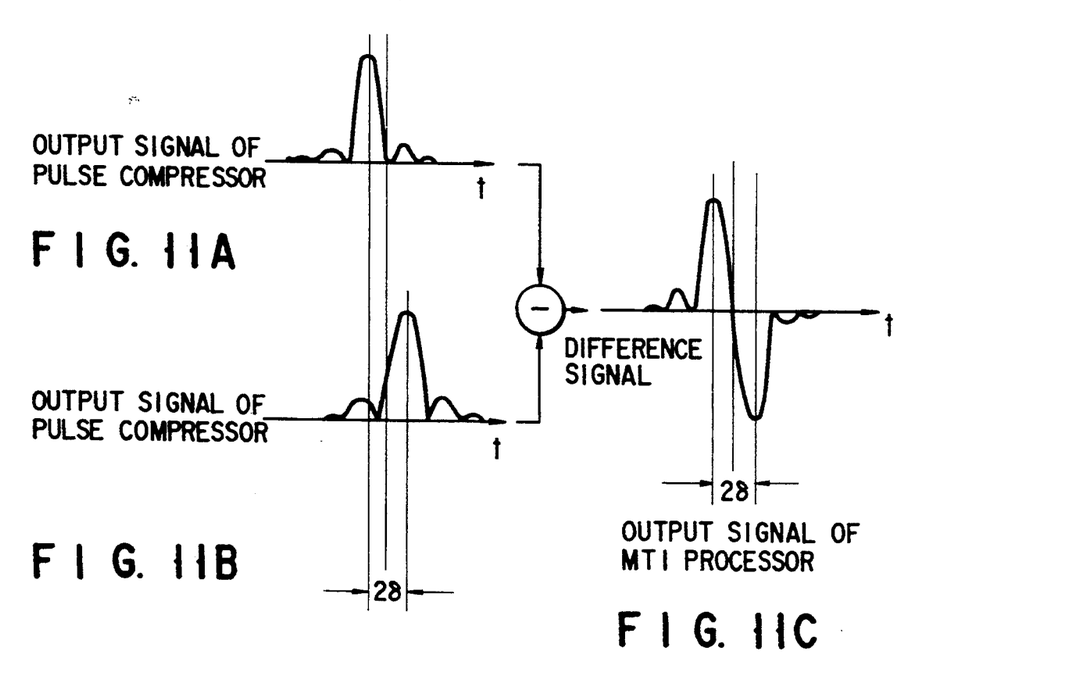
FIGS. 11A to 11C are waveform diagrams for illustrating the operation of the MTI processor shown in FIG. 4.

Regarding the output from the pulse compressor A21, an up-chirp signal including a reflection signal reflected by a moving target, i.e. Doppler frequency shift component fd, is delayed by $\delta$ ($\delta$ is proportional to Doppler frequency), as shown in FIG. 11A. Similarly, regarding the output from the pulse compressor A22, an up-chirp signal is progressed by $\delta$, as shown in FIG. 11B.

However, no time lag occurs in a reflection signal from a static clutter. Thus, the outputs from both pulse compressors A21 and A22 are sent to the subtracter A3, and a difference between the outputs is found. Thereby, the reflection signal from the static clutter can be removed. FIG. 11C shows the waveform of an output from the subtracter A3.

On the other hand, regarding the second line, all the same processing as for the first line is performed. Specifically, the sum component reception signal is extracted from the other distributed through the frequency filter 3222. The mixer 3242 mixes the extracted sum component reception signal with a sum component frequency signal coherent with the sum component transmission signal generated in the transmitter unit, thereby producing an intermediate frequency signal. An unnecessary frequency component is removed from the intermediate frequency signal in the frequency filter 3252, and a reflection signal from the static clutter is removed by the MTI processor 3262.

A phase difference occurs between the MTI outputs obtained from the MTI processors 3261 and 3262 in accordance with a frequency variation of the first local signal. Thus, the timings of the MTI outputs are made to coincide with each other, and the phases of the MTI outputs are detected by the phase detector 328. Thereby, the phase variation component due to the frequency variation of the first local signal can be removed.

The operation of the two-signal MTI processor 32 will now be described in detail.

The transmission wave in the transmitter unit is expressed by equations (1) to (3):

$$Tx(t) = A(t) \cdot \cos(\pi k \cdot t^2) \cdot \exp(j2\pi f1 \cdot t) + \quad (1)$$
$$A(t - dt) \cdot \cos\{\pi k \cdot (t - dt)^2\} \cdot \exp(j2\pi f2 \cdot t)$$

$$f1 = fx - f0 \quad (2)$$
$$f2 = fx + f0 \quad (3)$$

where
Tx(t): the transmission signal,
A(t): the pulse modulation factor,
dr: the two-frequency transmission time difference,
f1: the frequency of different component transmission signal,
f2: the frequency of sum component transmission signal,
fx: the frequency of first local signal,
f0: the frequency of second local signal,
k: frequency modulation factor.

The time-shared two-frequency transmission signal is amplitude-modulated by $\cos(\pi k \cdot t^2)$. The term of the amplitude modulation is expressed by $$\cos(\pi k \cdot t^2) = (\tfrac{1}{2}) \cdot \exp(j\pi k \cdot t^2) + (\tfrac{1}{2}) \cdot \exp(-j\pi k \cdot t^2) \quad (4)$$

In the right side of equation (4), the first term indicates an up-chirp and the second term indicates a down-chirp. Accordingly, the transmission signal of equation (1) can be expressed as a sum signal of the up-chirp and down-chirp signals and it is understood that the transmission signal of equation (1) consists of the up-chirp signal and the down-chirp signal which are transmitted simultaneously.

After the above transmission signal is transmitted, a reflection signal reflected by the static or moving target is received as received RF signal. The reception signal is expressed by equations (5) to (9). In equations (5) to (9) it is supposed that a moving target A, which moves at a velocity of v, is present at a distance of Ra.

$$Rx(t) = Rx1(t) + Rx2(t) \quad (5)$$
$$Rx1(t) = A(t-ta) \cdot Pa \cdot \cos\{\pi k \cdot (t-ta)^2\} \cdot \quad (6)$$
$$\exp[j2\pi\{f1 \cdot (t-ta) + f1a \cdot t\}] \quad (7)$$
$$Rx2(t) = A(t-dt-ta') \cdot Pa \cdot \cos\{\pi k \cdot (t-dk-ta')^2\} \cdot$$
$$\exp[j2\pi\{f2 \cdot (t-dt-ta') + f2a \cdot (t-dt)\}]$$
$$ta = 2Ra/c,\ ta' = 2(Ra - v \cdot dt)/c, \quad (8)$$
$$f1a = (2v/c) \cdot (fx + f0),\ f2a = (2v/c) \cdot (fx - f0) \quad (9)$$

where

Rx(t): the reception signal,
Rx1(t): the reception signal associated with the first pulse signal,
Rx2(t): the reception signal associated with the second pulse signal,
Pa: the intensity of the received reflection signal reflected by target A,
f1a: the Doppler frequency in frequency f1,
f2a: the Doppler frequency in frequency f2,
ta: the signal delay time of the first pulse due to target A,
ta': the signal delay time of the second pulse due to target A,
c: the velocity of light.

The reception signal is input to the two-signal MTI processor 32 and separated into a difference component reception signal (Rx1) and a sum component reception signal (Rx2). The signals (Rx1) and (Rx2) are mixed with a sum frequency signal (f1) and a difference frequency signal (f2) formed on the basis of the first and second local signals, thereby producing an intermediate frequency signal IF(t) which is expressed by $$IF(t) = IF1(t) + IF2(t) \quad (10)$$

$$\begin{aligned}IF1(t) &= Rx1(t) \cdot \exp(-j2\pi f1 \cdot t) \quad (11)\\ &= A(t-ta) \cdot Pa \cdot \cos\{\pi k \cdot (t-ta)^2\} \cdot \\ &\quad \exp\{j2\pi(f1a \cdot t - f1 \cdot ta)\}\end{aligned}$$

$$\begin{aligned}IF2(t) &= Rx2(t) \cdot \exp\{-j2\pi f2 \cdot (t-dt)\} \quad (12)\\ &= A(t-dt-ta') \cdot Pa \cdot \\ &\quad \cos\{\pi k \cdot (t-dt-ta')^2\} \cdot \\ &\quad \exp[j2\pi\{f2a \cdot (t-dt) - f2 \cdot ta'\}]\end{aligned}$$

where

IF1(t): the received IF signal associated with the first pulse signal,
IF2(t): the received IF signal associated with the second pulse signal.

Since each received IF signal has a coefficient of $\cos(\pi k \cdot t^2)$, it is understood that the received IF signal is a composite signal of the up-chirp signal and down-chirp signal. Each received IF signal is divided into two components in the MTI processor 3261 (3262). One of the divided two components is demodulated by the pulse compressor A21 having the frequency/delay time characteristics shown in FIG. 9, and the other component is demodulated by the pulse compressor A22 having the frequency/delay time characteristics shown in FIG. 10. Thereby, each signal input to the MTI processor 3261 (3262) is separated into the up-chirp signal and the down-chirp signal.

The up-chirp and down-chirp signals are supplied to the subtracter A3 and a difference signal is obtained. Thus, a reflection signal component including no Doppler frequency shift component is removed. This state corresponds to the case of f1a=f2a=0, and it can be confirmed by applying equation (4).

However, the reflection signal reflected from the moving target, i.e. the signal component including a Doppler frequency shift component, delays by δ in the up-chirp signal and progresses by δ in the down-chirp signal. Thus, the reflection signal remains after subtraction. The time difference is expressed by equations (13) and (14) in the sum component reception signal and difference component reception signal.

$$\delta 1 = f1a/k = 2v/c \cdot k \cdot (fx+f0) \quad (13)$$

$$\delta 2 = f2a/k = 2v/c \cdot k \cdot (fx-f0) \quad (14)$$

where

δ1 = the time difference of the sum component reception signal due to pulse compression,
δ2 = the time difference of the difference component reception signal due to pulse compression.

Even when the frequency fx of the first local signal has been changed, the time difference can be made constant by varying the frequency modulation factor k each time the transmission frequency has been changed.

$$k = Bw/\tau p \quad (15)$$

where

τp: the pulse width,
Bw: the bandwidth of the frequency modulation function.

Thus, the bandwidth of the frequency modulation function or pulse width may be varied.

In order to simplify equations, the output signals from the MTI processors 3261 and 3262 are expressed by $$s1(t) = B(t-ta) \cdot \exp\{j2\pi(f1a \cdot t - f1 \cdot ta)\} \quad (16)$$

$$s2(t) = B(t-dt-ta') \cdot \exp[j2\pi\{f2a \cdot (t-dt) - f2 \cdot ta'\}] \quad (17)$$

where s1(t): the output signal of the difference component-side MTI processor 3261,
s2(t): the output signal of the sum component-side MTI processor 3262,
B(t): the MTI output envelope waveform (with a real-number value with a sign.

The difference component reception signal output from the MTI processor 3261 is delayed by a delay time dt. The delayed signal and the sum component reception signal output from the MTI processor 3262 are fed to the phase detector 328. The obtained phase detection signal x(t) is expressed by $$
\begin{aligned}
x(t) &= S1(t-dt) \cdot s2(t)^* \\
&= B(t-dt-ta)^2 \cdot \exp[j2\pi\{(f1a - f2a) \cdot \\
&\quad (t-dt) - f1 \cdot ta + f2 \cdot ta'\}] \\
&= B(t-dt-ta)^2 \cdot \exp[-j2\pi\{2f0a \cdot (t-dt) - \\
&\quad fx \cdot v \cdot dt/c\}]
\end{aligned}
\tag{18}
$$

In equation (18), the following equation is used:

$$
\begin{aligned}
f1a - f2a &= (2v/c) \cdot (fx - f0) - (2v/c) \cdot (fx + f0) \\
&= -2 \cdot (2v/c) \cdot f0 \\
&= -2 \cdot f0a
\end{aligned}
\tag{19}
$$

where x(t): the output signal of the two-signal MTI processor 32,

*: the conjugate complex number, f0a: the Doppler frequency at frequency f0.

In equation 18, f0 is much less than fx and is approximated by the following equation:

$$
\begin{aligned}
f1 \cdot ta - f2 \cdot ta' &= (fx - f0) \cdot ta - (fx + f0) \cdot ta' \\
&\approx fx \cdot (ta - ta') \\
&= fx \cdot v \cdot dt/c
\end{aligned}
\tag{20}
$$

From equation (18), it is understood that the output signal from the two-signal MTI processor 32 includes no time-basis variation component at frequency fx of the first local signal. Thereby, the frequency deviation effect on fx due to the moving target can be eliminated.

If the pulse distance dt between the difference component transmission signal and the sum component reception signal is varied according to the following equation each time the frequency of the first local signal is varied, the term of equation 18 relating to the phase of the frequency component fx of the first local signal is constant.

$$fx \cdot dt = \text{const (constant)} \tag{21}$$

Specifically, supposing that the velocity of the target is constant, if fx·dt is constant, the MTI detection output expressed by equation 18 does not depend on the frequency fx of the first local signal.

As is clear from the above formulae, the frequency deviation component due to the moving target, which does not depend on the first local signal, is obtained. Thus, even if the oscillation frequency of the first local oscillator 21 is varied for every transmission pulse to prevent jamming, the moving target display device 4 can be made to function. In addition, as is clear from equation (18), the Doppler frequency component associated with f0 can be detected.

Accordingly, without losing the moving target detecting function, the radar apparatus having the above structure can quickly change the transmission frequency, change the transmission frequency to prevent jamming, etc., detect the Doppler frequency associated with the moving target, and detect and display the moving target.

The present invention is not limited to the embodiment, and it is not necessary to equalize the pulse train time intervals in the repetition cycle, as in the above embodiment. The present invention is applicable to the case where the transmission pulses are generated at non-equal intervals.

In the above embodiment, frequency modulation is employed to frequency-separate each pulse in the repetition cycle, but modulation may be performed in the receiver unit by any one of amplitude modulation, phase modulation and frequency modulation, or by a combination thereof. For example, it is possible to use an amplitude-limited chirp signal, or an amplitude binary-coded signal.

In the above embodiment, analog signals are employed in the method of separating the reflection signal to two-frequency signals by the two-signal MTI processor 32 and in the method of removing reflection signal due to the static clutter. It is possible, however, to separate two-frequency signals by using digital signals after A/D conversion in an A/D converter, or to remove the reflection signal from the static clutter. In the above embodiment, the two-frequency generator 323 generates the sum component signal (frequency fx+f0) and difference component signal (frequency fx−f0), but it may generate different frequency signals.

In the above embodiment, the two-frequency signals of sum component and difference component of the first and second local signals are used, but the two-frequency generator 25 and two-signal MTI processor 32 may be modified so that any combination (e.g. a combination of frequency fx and frequency fx+f0) of transmission two-frequency signals, formed by using the first and second local signals, may be used.

Moreover, in the above embodiment, the second local signal is amplitude-modulated so as to form the transmission signal of a composite signal of linearly frequency-modulated two signals (up-chirp signal and down-chirp signal). However, the second local signal may be amplitude-modulated so as to form the transmission signal of a composite signal of non-linearly frequency-modulated two signals.

Furthermore, various modifications may be made to the present invention without departing from the spirit of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radar apparatus comprising:

local signal generating means for generating a first local signal and a second local signal which are coherent sine wave signals having different frequencies;

local signal modulation means for modulating one of the first and second local signals generated from the local signal generating means, thereby generating a composite signal of two signals modulated by different modulation functions;

two-frequency generating means for generating first and second transmission signals of different frequencies on the basis of a combination of the composite signal obtained by the local signal modulation means and the non-modulated local signal;

transmission/reception means for repeatedly transmitting the first and second transmission signals generated by the two-frequency generating means in a time-sharing manner, and receiving a reflection signal of the transmitted signals;

signal separating means for separating the received signal received by the transmission/reception means into two frequency components corresponding to the first and second transmission signals;

MTI processing means for separating each reception signal separated by the signal separating means into two signal components modulated by the different modulation functions and removing a reflection signal from a static clutter by a subtraction operation, and thereafter synchronizing the two reception signals, thereby extracting a reflection signal component from a moving target; and display means for displaying the moving target on the basis of the detection output from the MTI processing means.

2. The radar apparatus according to claim 1, wherein the local signal generating means includes frequency changing means for changing the frequency of the local signal.

3. The radar apparatus according to claim 1, wherein said modulation functions are represented by a group consisting of modulation signals with frequencies increasing linearly with passage of time and modulation signals with frequencies decreasing linearly with passage of time.

4. The radar apparatus according to claim 1, wherein the transmission/reception means changes one or both of a frequency modulation bandwidth and a transmission pulse width of the transmission signal, in accordance with the frequency change of the transmission signal.

5. The radar apparatus according to claim 1, wherein the transmission/reception means changes the transmission pulse interval of the time-shared transmission pulses, in accordance with the frequency change of the transmission signal.

* * * * *